220-2.1

SEARCH ROOM

May 20, 1952

E. DESPOIS
MANUFACTURE OF THE ENVELOPES OF ELECTRON DISCHARGE AND OTHER EVACUATED DEVICES
Original Filed Aug. 9, 1946

Re. 23,492

Orig. 2504,504

INVENTOR
EDOUARD DESPOIS
By John B. Brady
Attorney

Reissued May 20, 1952 Re. 23,492

UNITED STATES PATENT OFFICE 23,492

MANUFACTURE OF THE ENVELOPES OF ELECTRON DISCHARGE AND OTHER EVACUATED DEVICES

Edouard Despois, Paris, France, assignor to Societe Francaise Radio Electrique, a corporation of France Original No. 2,504,504, dated April 18, 1950, Serial No. 689,330, August 9, 1946. Application for reissue February 7, 1952, Serial No. 270,310

6 Claims. (Cl. 220—2.1)

Matter enclosed in heavy brackets [ ] appears in the original patent but forms no part of this reissue specification; matter printed in italics indicates the additions made by reissue.

This invention relates to the manufacture of the envelopes of electron discharge and other evacuated devices and more particularly to methods of closing or sealing together the parts constituting such envelopes.

One of the objects of my invention is to provide an improved method for closing and evacuating electron discharge and other evacuated devices in which the parts of the envelope are maintained in vacuum-tight relation by atmospheric pressure automatically during the evacuating process.

Another object of my invention is to provide an improved method for uniting complementary parts of the envelope of an electron discharge tube or other vessel which consists in preparing peripheral edges of the complementary parts in a substantially convex mating relation to form a substantially perfect seal which is then raised in temperature during the evacuating process to cause the material at the joint to flow together, and form a vacuum-tight seal.

Still another object of my invention is to provide a method for forming joints between parts of an electron discharge or other evacuated device which consists in forming complementary peripheral surfaces on the parts which are annealed and polished to form a substantially perfect seal between the parts during an internal evacuating process during which time the joint is raised in temperature to cause the material at the joint to start to flow and provide a vacuum-tight seal.

Figure 1:
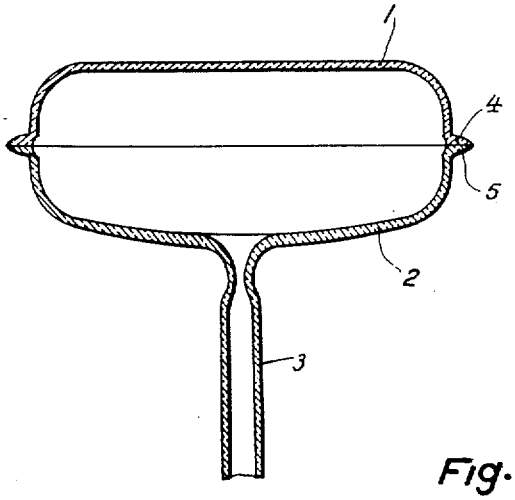
Figure 3:
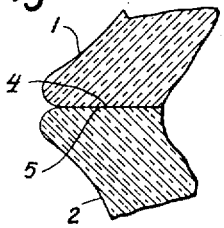
Figure 2:
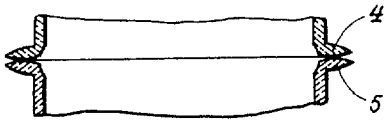

Other and further objects of my invention reside in the method of preparing complementary parts of an envelope for an electron discharge tube or other evacuated device as set forth more fully in the specification hereinafter following by reference to the accompanying drawings, in which:

Figure 1 is a cross-sectional view showing the parts of an electron discharge tube or other evacuated device assembled in coacting relation during the evacuating process;

Fig. 2 is a fragmentary cross-sectional view showing the manner in which convex peripheral surfaces are provided on the co-acting parts of the electron discharge tube preparatory for a sealing operation; and Fig. 3 is a fragmentary enlarged sectional view showing the manner in which the complementary peripheral mating edges of the parts of the envelope are fused in vacuum-tight relation according to the method of my invention.

The closing or sealing together of the parts of the envelope of an electron or other evacuated tube generally involves the making of a gas-tight joint between two parts, usually of glass, which together constitute the envelope. This operation, which is usually effected by fusing the parts together, calls for very great care to ensure that internal electrodes or other parts in the tube, in particular [oxidized] *oxide* cathodes and zirconated plates, shall not be damaged as a result of being carried to a high temperature in the presence of the ambient gases during the fusing operation. Modern requirements in tube design and practice, in particular as regards high power tubes, involve the use, in the envelope of a tube, of glass of special electrical properties and high melting point so that, when closure by fusing is effected, considerable heat is necessary and the risk of damage by heat is accordingly great.

It has heretofore been proposed to employ a reducing or neutral gas in an envelope to protect electrodes or electrode mounts during closure by fusing, but this proposal involves manufacturing complications and moreover experience shows that it is insufficient to secure adequate protection if the necessary fusing temperature is really high.

The present invention seeks to avoid the above defects and provide a method of closing an evacuated tube such that the electrodes or other internal members of the tube are in vacuum at the moment when the temperature of the envelope is raised to fusing point.

The invention is mainly based upon the fact that two suitably polished surfaces placed one on the other will provide a joint which is able to maintain, for a time at least, a vacuum equal to that obtainable by the best vacuum pumps at present in use. This fact can be utilised to great advantage in non-sealed tubes of the type adapted to be dismantled and whose envelopes do not, during normal use reach a very high temperature. The invention is also in part based on the fact that if such polished surfaces have been carefully annealed before polishing, a perfectly tight seal can be obtained by raising the joint to a temperature sufficient just to cause the material at the joint to start to flow, that is to say to a temperature which in practice is somewhat below that at which deformation of the envelope as a whole would occur.

According to this invention a method of closing the envelope of an evacuated tube consists in polishing the complementary surfaces of parts which are to constitute said envelope so that said surfaces will mate in a substantially vacuum tight manner, placing said parts in juxtaposition with said surfaces mating, pumping out said envelope to press the parts firmly together, and then fusing said surfaces together while the envelope is still under vacuum by raising the temperature to a value somewhat below the temperature of deformation of the envelope.

The invention is illustrated in the accompanying drawings which show by way of example only, how the said invention may be carried into practice.

Referring to Fig. 1 this represents in section two parts 1 and 2 of an envelope which are to be sealed together along their edges 4 and 5, the part 2 having a pump tail tube 3 through which the envelope may be exhausted. The shape indicated in the section is not essential, but is a convenient one for polishing, lending itself to polishing by automatic polishing machines. It is unnecessary to take special care in polishing to ensure that the surfaces 4, 5 to be brought into contact with one another shall be perfectly planar; indeed it is preferable to obtain the slightly convex form shown in Fig. 2 and which will be obtained in any case if no special precautions are taken to avoid it. This shape is advantageous for avoiding minor deformations liable to occur when evacuating envelopes of large size.

It is important that the parts 1 and 2 to be sealed together shall be carefully annealed before polishing the surfaces 4 and 5. In the absence of such annealing there is the risk that as soon as the glass commences to release its internal tension when the temperature is raised, faults in the form of surface deformation may occur due to differences of expansion as between glass in the annealed state and glass in the unannealed state.

The process of closing a tube in accordance with the present invention may thus be summarized as follows:

The lower part 2 of the tube is fixed by the tail 3 on the evacuating pump (not shown), and the part 1 is placed on part 2 edge to edge, and vacuum is then applied to pull the parts 1 and 2 firmly against one another. When a desired vacuum is reached a permanent seal between the edges 4 and 5 is obtained by raising the evacuated tube to a temperature a little below that at which deformation would occur. There is thus obtained a good permanent seal without any edge deformation, thereby sealing the edges together by molecular cohesion.

While I have described the process of my invention in accordance with its preferred method of procedure I realize that details of my method may be changed and I desire that it be understood that no limitations upon my invention are intended other than may be imposed by the scope of the appended claims.

What I claim is:

1. The method of closing the envelope of an electron discharge tube which consists in polishing the complementary surfaces of parts which are to constitute said envelope so that said surfaces will mate in a substantially vacuum tight manner, placing said parts in juxtaposition with said surfaces mating, pumping out said envelope through one of the parts to press the parts firmly together, with said parts held in unison by external atmospheric pressure, and then fusing said surfaces together while the envelope is still under vacuum, by raising the temperature to a value somewhat below the temperature of deformation of the envelope.

2. The method as claimed in claim 1 wherein the material at the mating surfaces is annealed before polishing.

3. The method as claimed in claim 1 wherein the polished mating surfaces are slightly convex.

4. The method of manufacturing air-tight bulbs for vacuum tubes having a pair of complementary parts housing tube elements therein which consists in dressing and polishing the peripheral edges of the parts constituting the bulb, annealing the parts of the bulb, positioning the parts so that they peripherally contact each other, creating a vacuum within the parts, raising the temperature of the parts sufficiently high to assure the degassing of the elements of the tube and below the softening point of the parts of the bulb, and fusing the peripheral contact of the parts into intimate connection for forming a vacuum tight-seal.

[5. An air-tight envelope for a vacuum tube comprising two parts opposite each other and directly sealed to each other, the terminal surface of at least one of said parts having an optical polish coextensive with the sealed contact.]

[6. An air-tight envelope for a vacuum tube comprising two parts opposite each other and directly sealed to each other, the terminal surface of at least one of said parts having an optical polish, inside the tube, coextensive with the sealed contact.]

*7. An air-tight envelope for a vacuum tube comprising two parts opposite each other and directly sealed to each other, the terminal surface of at least one of said parts having an unsealed non-contacting optical polish inside the tube in continuity with and an extension of the sealed contact.*

*8. An air-tight envelope for a vacuum tube comprising two parts opposite each other and directly sealed to each other forming a sealed surface portion, at least one of the parts having an optically polished unsealed non-contacting surface portion constituting a prolongation of said sealed surface portion.*

EDOUARD DESPOIS.

REFERENCES CITED

The following references are of record in the file of this patent or the original patent:

UNITED STATES PATENTS

| Number | Name | Date |
|---|---|---|
| 1,079,804 | Sidon | Nov. 25, 1913 |
| 2,171,226 | Schoonenberg | Aug. 29, 1939 |
| 2,268,670 | Ronci | Jan. 6, 1942 |
| 2,269,082 | Herriger | Jan. 6, 1942 |